United States Patent [19]

Abramoff

[11] 3,856,728

[45] Dec. 24, 1974

[54] ACRYLONITRILE-BUTADIENE-STYRENE POLYMERS HAVING IMPROVED RESISTANCE TO DISCOLORATION

[75] Inventor: Charles Abramoff, New York, N.Y.

[73] Assignee: Argus Chemical Corporation, Brooklyn, N.Y.

[22] Filed: Apr. 26, 1971

[21] Appl. No.: 137,609

[52] U.S. Cl. ... 260/23.7 N, 252/400 A, 260/45.7 P, 260/45.8 A, 260/45.85 B, 260/45.85 P, 260/45.95 R, 260/45.95 C, 260/45.95 G, 260/880 R

[51] Int. Cl. ............................................. C08f 45/58

[58] Field of Search ....... 260/45.7 P, 45.8 A, 45.95, 260/23 H, 400 A, 404, 23.7 N

[56] References Cited
UNITED STATES PATENTS

| | | | |
|---|---|---|---|
| 2,733,226 | 1/1956 | Hunter | 260/29.7 |
| 3,080,338 | 3/1963 | Nudenberg et al. | 260/45.7 |
| 3,121,068 | 2/1964 | Baum | 260/23 |
| 3,132,027 | 5/1964 | Norton et al. | 99/169 |
| 3,189,569 | 6/1965 | Finestone et al. | 260/23 |
| 3,189,570 | 6/1965 | Pavlin et al. | 260/23 |
| 3,211,652 | 10/1965 | Hinkamp | 252/49.8 |
| 3,251,792 | 5/1966 | Homberg | 260/23 |
| 3,352,820 | 11/1967 | Bawn | 260/45.75 |
| 3,359,234 | 12/1967 | Milionis et al. | 260/45.75 |
| 3,392,141 | 7/1968 | Blumberg et al. | 260/45.7 |
| 3,414,636 | 12/1968 | Ott et al. | 260/876 |
| 3,449,471 | 6/1969 | Weitzel et al. | 260/880 |
| 3,457,218 | 7/1969 | Haas et al. | 260/45.8 |
| 3,472,813 | 10/1969 | Hecker et al. | 260/45.75 |
| 3,535,277 | 10/1970 | Miller et al. | 260/45.95 |
| 3,586,657 | 6/1971 | Casey | 260/45.95 |
| 3,637,555 | 1/1972 | Marinacci et al. | 260/23.7 |

*Primary Examiner*—Melvyn I. Marquis
*Assistant Examiner*—R. A. White

[57] ABSTRACT

Acrylonitrile-butadiene-styrene polymers having an enhanced resistance to discoloration when heated at 300° to 375° or higher are provided, comprising an organic phosphite, a polyhydric polycyclic phenol, and an epoxy compound.

10 Claims, No Drawings

ACRYLONITRILE-BUTADIENE-STYRENE POLYMERS HAVING IMPROVED RESISTANCE TO DISCOLORATION

Acrylonitrile-butadiene-styrene polymers, also known as ABS polymers, have a tendency to develop a dark discoloration when heated at temperatures necessary to process them, such as during molding and calendering. This discoloration is not masked even when pigments are added, although the pigment does to some extent hide a slight off-color.

The development of this discoloration is generally associated with a decomposition or degradation undergone by the polymer at elevated temperatures, of the order of 300° to 375° F. The addition of any of a number of stabilizers have been proposed, to overcome this tendency.

Cummings, U.S. Pat. No. 3,267,069, dated Aug. 16, 1966, describes stabilizer combinations comprising a mixture of zinc sulfide and an ester of thiodipropionic acid, to which can also be added organic phosphites, polyhydric polycyclic phenols, and organic amines.

Hecker and Abramoff, U.S. Pat. No. 3,472,813, patented Oct. 14, 1969, suggest combinations of alkyl polyphosphate salts and polyhydric polycyclic phenols, to which can also be added organic phosphites of the type described in U.S. Pat. No. 3,244,650, dated Apr. 5, 1966, to Hecker et al.

Societa Edison, Netherlands patent application No. 64/11 434, published Apr. 12, 1965, describes the addition of epoxy fatty acid esters as a plasticizer to acrylonitrile - styrene - butadiene polymers to improve molding without thermal degradation. Combinations of the epoxy fatty acid ester as plasticizer with lead salts and acid phosphites as stabilizers are suggested.

One of the problems with the stablizer combinations in use heretofore is that they are effective either with an unpigmented or with a pigmented acrylonitrile-butadiene-styrene polymer, but not with both. This means that the formulator must use two different types of stabilizer compositions, according to whether the polymer that he wishes to stabilize is pigmented or unpigmented.

In accordance with the instant invention, it has been determined that stabilizer systems comprising an organic phosphite, a polyhydric polycyclic phenol, and an epoxy compound are capable of enhancing the resistance to discoloration of both pigmented and unpigmented acrylonitrile-butadiene-styrene polymers when heated at elevated temperatures of from 300° to 375°F. and higher. These stabilizer combinations display an enhanced stabilizing effectiveness, that is greater than that displayed by any of the stabilizer components, taken separately or in pairs. Evidently, these compounds complement each other in an unusual manner, and relative lack of effectiveness of the epoxy compound, taken alone, or in combinations with the phosphite or the phenol, makes the overall enhanced effectiveness of the three-component combination in both pigmented and unpigmented polymer all the more surprising.

The polyhydric polycyclic phenols employed in the three component stabilizer combinations of the invention include aromatic nuclei which are linked by a polyvalent linking radical and are defined by the formula:

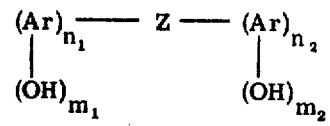

wherein Z is a polyvalent linking group selected from the group consisting of oxygen; sulfur; aliphatic, cycloaliphatic, and aromatic hydrocarbons; oxyhydrocarbon; thiohydrocarbon; heterocyclic; carbonyl; sulfinyl; and sulfonyl groups, and has up to 20 carbon atoms.

Ar is a phenolic nucleus which can be a phenyl or a polycarbocyclic group having condensed or separate phenyl rings; each Ar group contains at least one free phenolic hydroxyl group up to a total of four, $m_1$ and $m_2$ are numbers from 1 to 4, and $n_1$ and $n_2$ are numbers, 1 or greater, and preferably from 1 to 4. The Ar rings can also include additional rings connected by a bivalent linking nucleus of the type Z, for example Ar—Z—Ar—Z—Ar.

The aromatic nucleus Ar can, in addition to phenolic hydroxyl groups, include one or more inert substituents. Examples of such inert substituents include hydrogen, halogen atoms, e.g., chlorine, bromine and fluorine; organic radicals containing from one to about 30 carbon atoms, such as alkyl, aryl, alkenyl, alkaryl, aralkyl, cycloalkenyl, cycloalkyl, alkoxy, aryloxy and acyloxy

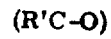

where R' is aryl, alkyl or cycloalkyl, or thio hydrocarbon groups having from one to about 30 carbon atoms, and carboxyl

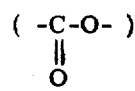

groups. Usually, however, each aromatic nucleus will not have more than about 18 carbon atoms in any hydrocarbon substituent group per nucleus.

Typical aromatic nuclei include phenyl, naphthyl, phenanthryl, triphenylenyl, anthracenyl, pyrenyl, chrysenyl, and fluorenyl groups.

The simplest form of polyhydric polycyclic phenol has the structure:

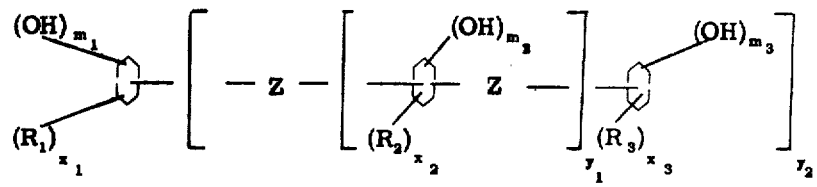

wherein $R_1$, $R_2$ and $R_3$ are inert substituent groups as set forth above, $m_1$ and $m_3$ are integers from one to a maximum of five, $m_2$ is an integer from 1 to a maximum of 4, $x_1$ and $x_3$ are integers from 0 to 4, and $x_2$ is an integer from 0 to 3; $y_1$ can be an integer from 0 to about 6 and $y_2$ can be an integer from 1 to 5, preferably 1 or 2.

Preferably, the hydroxyl groups are located ortho and/or para to Z, and there is only one hydroxyl group per phenyl nucleus.

Exemplary Z groups are alkylene, alkylidene, alkenylene, arylalkylene, aralkylidene, cycloalkylene and cycloalkylidene, and oxa- and thia-substituted such groups, carbonyl groups, tetrahydrofuranes, esters and triazino groups. The Z groups are usually bi-, tri-, or tetravalent, connecting two, three or four Ar groups. However, higher valence Z groups, connecting more than four Ar groups, can also be used. According to their constitution the Z groups can be assigned to subgenera as follows:

1. Z groups made up of a single carbon carrying at least one hydrogen with other substituents linking two Ar nuclei, such as

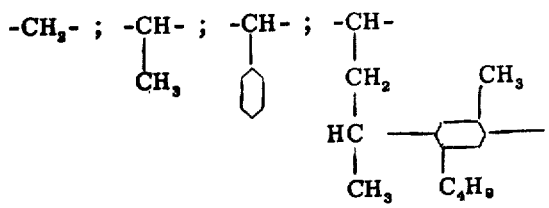

and

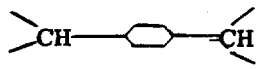

2. Z groups made up of a single carbon carrying only substituents other than hydrogen, such as

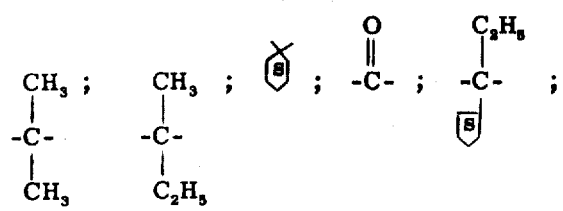

and 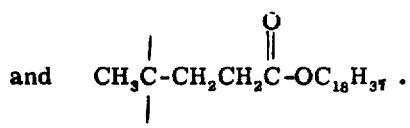

3. Z groups where at least two carbons connect the aromatic groups in an open-chain or cyclic arrangement, such as

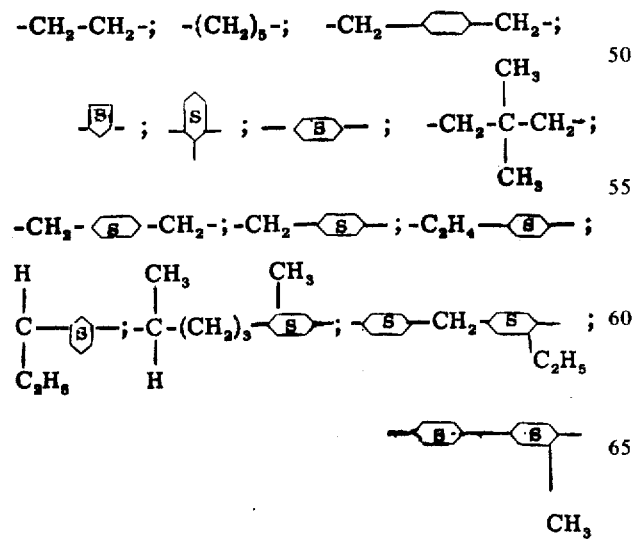

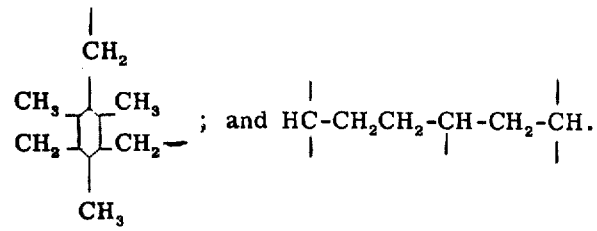

4. Z groups where only atoms other than carbon link the aromatic rings, such as

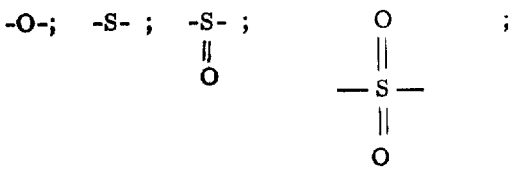

and $-(S)_x-$.

5. Z groups made up of more than a single atom including both carbon and other atoms linking the aromatic nuclei, such as:

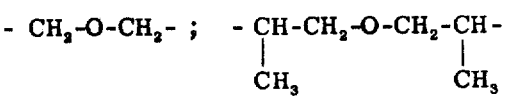

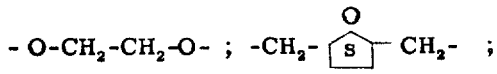

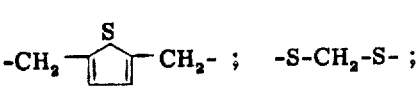

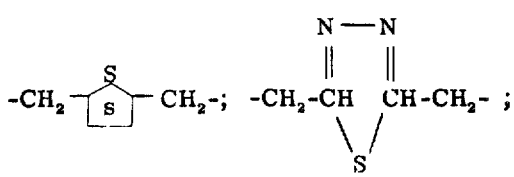

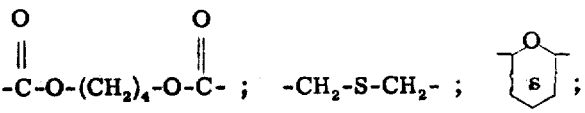

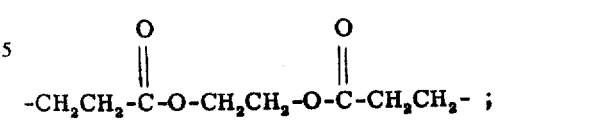

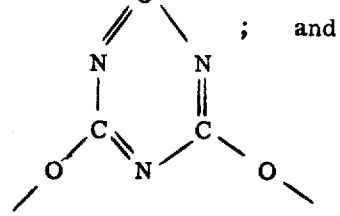

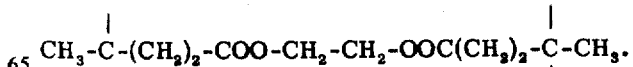

Exemplary polyhydric polycyclic phenols used in accordance with the instant invention are 4,4'- methylenebis-(2-tertiary-butyl-5-methyl-phenol), 2,2'-bis(4-hydroxyphenyl) propane, methylenebis-(p-cresol), 4,4'-oxobis-phenol, 4,4'-oxobis(3-methyl-5-isopropyl-phenol), 4,4'-oxobis(3-methylphenol), 2,2'-oxobis(4-dodecyl-phenol), 2,2'-oxobis(4-methyl-5-tertiary-butyl-phenol), 4,4'-n-butylidenebis-(2-t-butyl-5-methyl-phenol), 2,2'-methylenebis-[4-methyl-6,(1-methyl-cyclohexyl)-phenol], 4,4'-cyclohexylidenebis(2-tertiary-butyl-phenol), 2,6-bis-(2'-hydroxy-3'-t-butyl-5'-methyl-benzyl)-4-methyl-phenol, 4,4'-oxobisnaphthalene-5,5-diol), 1,2'-methylenebis(naphthalene-1,8-diol), 1,3'-bis(naphthalene-2,5-diol)propane, and 2,2'-butylidenebis(naphthalene-2,7-diol), di(hydroxyphenyl) ketone, (3-methyl-5-tert-butyl-4-hydroxyphenyl)-4'-hydroxyphenyl)methane, 2,2'-methylenebis(4-methyl-5-isopropylphenol), 2,2'-methylenebis(5-tert-butyl-4-chlorophenol), (3,5-di-tert-butyl-4-hydroxyphenyl)-(4'-hydroxy-phenyl) methane, (2-hydroxyphenyl)-(3'-5'-di-tert-butyl-4'-hydroxyphenyl) methane, 2,2'-ethylidenebis(4-octylphenol), 4,4'-isopropylidenebis (2-tert-butyl-phenol), 2,2'-isobutylidenebis-(4-nonylphenol), 2,4-bis(4-hydroxy-3-t-butylphenoxy-6-(n-octylthio)-3,3,5-triazine, 2,4,6-tris(4-hydroxy-3-t-butylphenoxyl)-1,3,5-triazine, 2,2'-bis (3-methyl-5-t-butyl-4-hydroxyphenyl)-thiazolo(5,4-d)-thiazole, 4,4'-bis(4-hydroxyphenyl)pentanoic acid octadecyl ester, cyclopentylidene 4,4'-bisphenol, 2-ethylbutylidene 4,4'-bisphenol, 4,4'-cyclooctylidenebis (2-cyclohexylphenol), β,β-thiodiethanolbis(3-tert-butyl-4-hydroxyphenoxy acetate), 1,4-butanediolbis(3-tert-butyl-4-hydroxyphenoxy acetate), pentaerythritoltetra-(4-hydroxyphenol propionate), 2,4,4'-trihydroxy-benzophenone, bis(2-tert-butyl-3-hydroxy-5-methylphenyl) sulfide, bis(2-tert-butyl-4-hydroxy-5-methylphenyl) sulfide, bis(2-tert-butyl-4-hydroxy-5-methylphenyl) sulfoxide, bis(3-methyl-5-tert-butyl-4-hydroxy benzyl) sulfide, bis(2-hydroxy-4-methyl-6-tert-butyl phenyl) sulfide, 4,4'-bis(4-hydroxyphenyl) pentanoic acid octadecyl thiopropionate ester, 1,1,3-tris(2'-methyl-4'-hydroxy-5'-tert-butylphenyl) butane, 1,1,3-tris(1-methyl-3-hydroxy-4-tert-butylphenyl) butane, 1,8-bis(2-hydroxy-5-methylbenzoyl-)-n-octane, 2,2'-methylenebis-[4'-(3-tert-butyl-4-hydroxyphenyl)-thiazole], (1-methyl-3-(3-methyl-5-tert-butyl-4-hydroxybenzyl) naphthalene), 2,2'-(2-butene)bis-(4-methoxy-6-tert-butyl phenol).

The polyhydric polycyclic phenols used in the invention can also include condensation products of phenol or alkyl phenols with aldehydes, for example formaldehyde, acetaldehyde, and propionaldehyde, or with ketones, for example, acetone.

The polyhydric polycyclic phenols used in the invention can also be condensation products of phenol or alkyl-phenols with hydrocarbons having a bicyclic ring structure and a double bond or two or more double bonds, such as α-pinene, β-pinene, di-pentene, limonene, vinylcyclohexane, dicyclopentadiene, alloocimeme, isoprene, and butadiene. These condensation products are usually obtained under acidic conditions in the form of more or less complex mixtures of monomeric and polymeric compounds. However, it is usually not necessary to isolate the individual constituents. The entire reaction product, merely freed from the acidic condensation catalyst and unchanged starting material, can be used with excellent results. While the exact structure of these phenolic condensation products is uncertain, the Z groups linking the phenolic nuclei all fall into subgenus 3. For methods of preparation see U.S. Pat. No. 3,124,555, U.S. Pat. No. 3,242,135, and British Pat. No. 961,504.

The alkyl, aryl, aryl alkyl, alkyl aryl, cycloalkyl, alkyl cycloalkyl, and cycloalkyl alkyl organic phosphites contain a total of from one to three groups selected from aryl, alkyl, and cycloalkyl groups having from one to thirty carbon atoms and hydrogen. These groups may be present in any combination. Exemplary are triphenyl phosphite, tricresyl phosphite, tri(dimethylphenyl) phosphite, tri-n-butyl phosphite, triisooctyl phosphite, tridodecyl phosphite, diisooctyl phenyl phosphite, isooctyl diphenyl phosphite, tri(p-t-octylphenyl) phosphite, tri(p-t-nonylphenyl) phosphite, tri(p-t-nonyl-o-cresyl) phosphite, tri(p-t-nonylphenyl) phosphite, tri(p-t-nonyl-o-cresyl) phosphite, tribenzyl phosphite isobutyl dicresyl phosphite, isooctyl di(p-t-octylphenyl) phosphite, tri(2-ethylhexyl) phosphite, tri(2-cyclohexylphenyl) phosphite, trialpha-naphthyl phosphite, tri(diphenyl) phosphite, tri(2-phenyl-ethyl) phosphite, tricyclohexyl phosphite, and tricyclopentyl phosphite.

Also useful are the polycyclic phenolic phosphites defined by the formula:

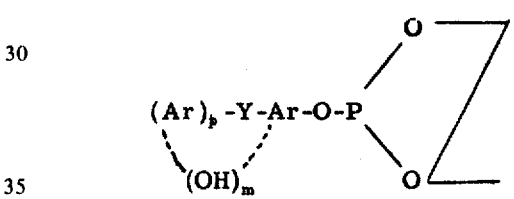

wherein Z is selected from the group consisting of hydrogen and aliphatic, cycloaliphatic, aromatic and

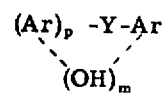

groups, taken
in sufficient number to satisfy the valences of the two phosphite oxygen atoms. At least one Z group is an aliphatic or cycloaliphatic group.

$m$ is a number from 1 to 5, and $p$ is a number from 1 to 4.

$Y$ is a polyvalent linking group selected from the group consisting of oxygen; sulfide sulfur $(S)_x$, where $x$ is a number from 1 to 5, linked directly to Ar or via aliphatic, cycloaliphatic and aromatic hydrocarbon groups attached to the Ar group; oxyaliphatic; thioaliphatic; oxycycloaliphatic, thiocycloaliphatic; heterocyclic; oxyheterocyclic, thioheterocyclic, carbonyl, sulfinyl, and sulfonyl groups.

The Ar group can be any aromatic nucleus, monocarbocyclic or polycarbocyclic, with condensed or separate rings, and the rings when separate can also be connected by a bivalent linking nucleus of the type of Y, for example, Ar — Y — Ar — Y — Ar.

Exemplary of types of phosphites falling within the above general formula are the following:

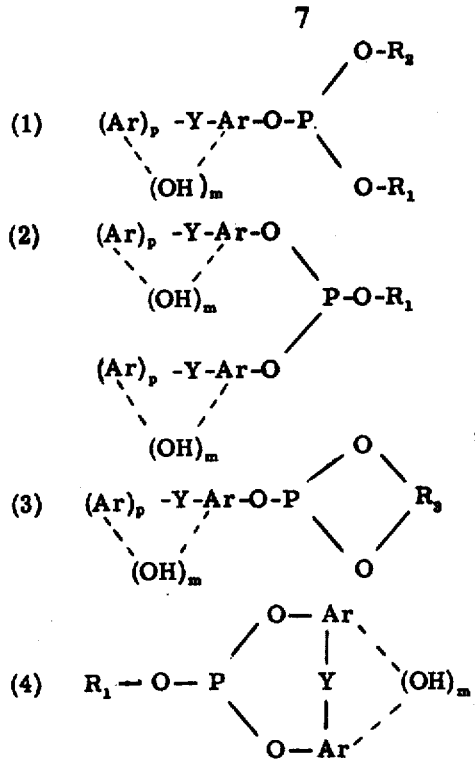

In the above formulae, $R_1$ is a monovalent aliphatic or cycloaliphatic group, $R_2$ is a monovalent aliphatic, cycloaliphatic, aromatic or heterocyclic group, and $R_3$ is a bivalent aliphatic or cycloaliphatic group. Any

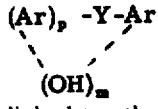

groups can be cross-linked to other phosphite groups.

The polymeric organic phosphite esters have the general formula:

wherein $n$, $p$, Ar and Y are as defined above, and at least one of the Z's is a cycloaliphatic or aliphatic group, the aliphatic and cycloaliphatic groups being present in sufficient number to impart an enhanced stabilizing effectiveness for polyvinyl chloride and polyolefin resins to the phosphite, and $n$ and $p_1$ represent the number of such bracketed repeating units in each chain, and can range from zero to an indefinite upper limit, depending upon the molecular weight of the polymer. Inasmuch as compatibility with the synthetic resin may decrease at very high values of $n$, when the polymers tend to become resinuous in nature, usually $n$ does not exceed 10, and preferably does not exceed 5.

Z can be monovalent or polyvalent, inasmuch a Z can be a plurality of radicals taken separately to satisfy the valences of the phosphite oxygen atoms to which Z is attached. Furthermore, Z can be a bivalent radical forming a heterocyclic ring with the oxygen atoms, or when present in the repeating unit can form a cross-link to adjacent polyphosphite chains of like type. Thus Z when bivalent can be an aliphatic bivalent group, an aromatic bivalent group, a cycloaliphatic bivalent group and a heterocyclic bivalent group. Z when monovalent can include an aliphatic, cycloaliphatic, aromatic or heterocyclic group.

It will be apparent that when $p$ is one and the Z radicals present in the repeating unit of the polymeric phosphite are monovalent, the polyphosphites exist as linear chains, and when the Z radicals in the repeating units are bivalent cross-links, the polyphosphites take the form of cross-linked polymers.

The polyphosphites which exist as cross-linked polymers wherein the Z of the repeating unit is a cross-link to an adjacent chain can take a variety of forms, only some of which because of space limitations can be represented here. The following formulae are exemplary of cross-linked polymers:

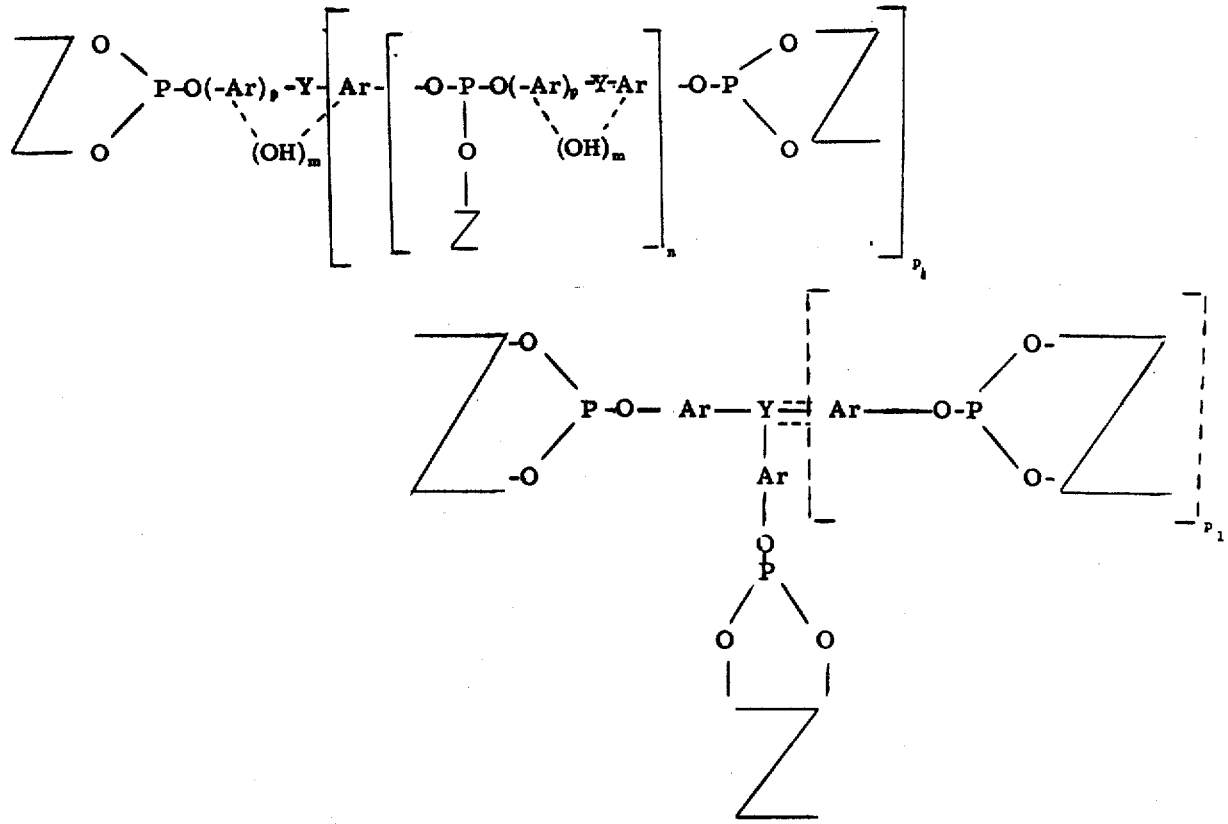

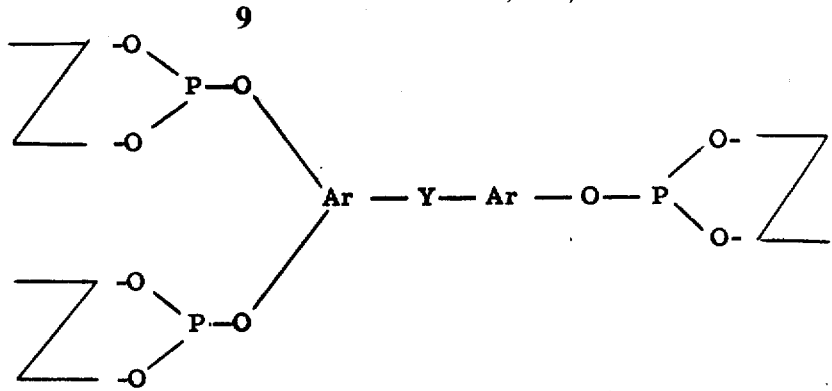

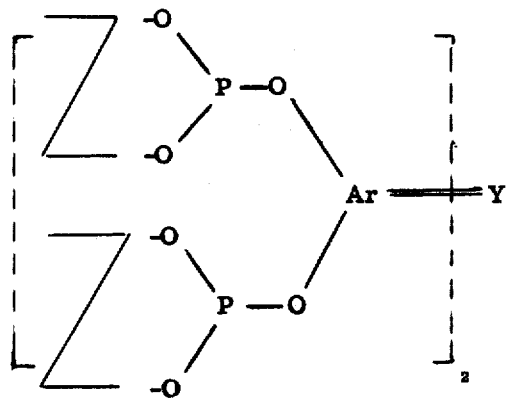

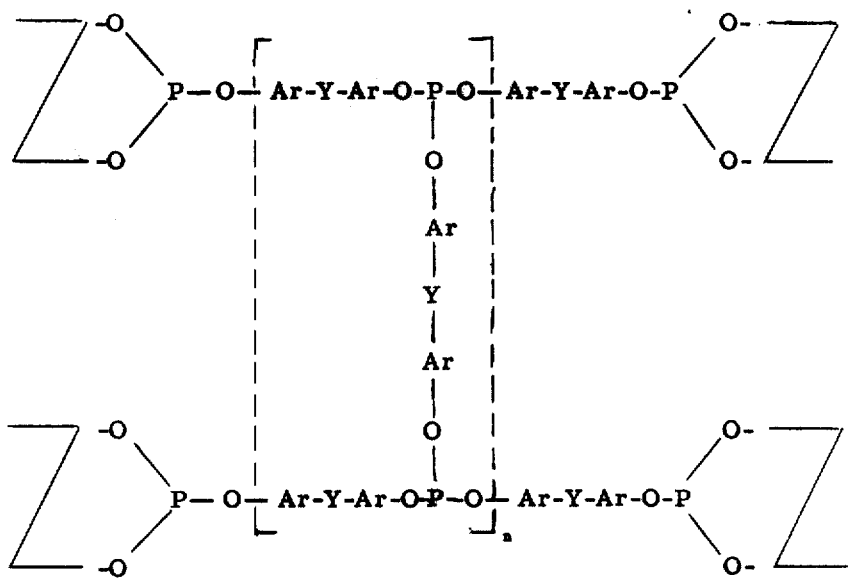

In all of the above formulae, the Z groups normally have a total of from one to about 30 carbon atoms, and preferably from about two to 10 carbon atoms. Z groups when bivalent usually have at least two carbon atoms where they form a heterocyclic ring with two oxygen atoms of a phosphite group. $n$ and $p_1$ are numbers greater than zero and preferably from one to three.

The aromatic nucleus Ar can in addition to phenolic hydroxyl groups include one or more inert substituents. Examples of such inert substituents include halogen atoms, e.g., chlorine, bromine and fluorine; hydrocarbon groups (such as alkyl or cycloalkyl groups) having from one to 30 carbon atoms; oxy- or thio-hydrocarbon groups having from one to about 30 carbon atoms, carbonyl (C=O) and carboxyl

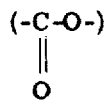

groups. Usually, however, each aromatic nucleus will not have more than about 18 carbon atoms in any hydrocarbon substituent group. The Ar group can have from one to four substituent groups per nucleus.

Typical aromatic nuclei include phenyl, naphthyl, phenanthryl, triphenylenyl, anthracenyl, pyrenyl, chrysenyl, and fluorenyl groups.

In these phosphites there can be none or from one phenolic hydroxyl group or residue thereof for each aromatic ring, up to five hydroxyl groups per ring.

The simplest form of

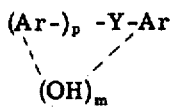

group has the structure:

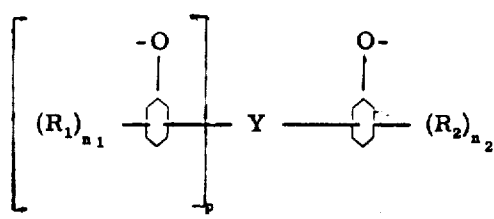

$R_1$ and $R_2$ represent hydroxyl groups or the inert substituents set forth above, $p$ is as defined above and $n_1$ and $n_2$ represent the number of R groups on each ring, and have a value from 0 to 4.

Exemplary Y groups are alkylene, alkylidene, alkenylene, arylkylene, aralkylidene, cycloalkylene and cycloalkylidene, and oxy-, and thio-substituted such groups, carbonyl, tetrahydrofuranes, esters and triazino groups. The Y groups are usually bi-, tri-, or tetravalent, connecting two, three or four Ar groups. However, higher valence Y groups, connecting more than four Ar groups, can also be used.

Examples of Y are:

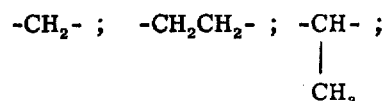

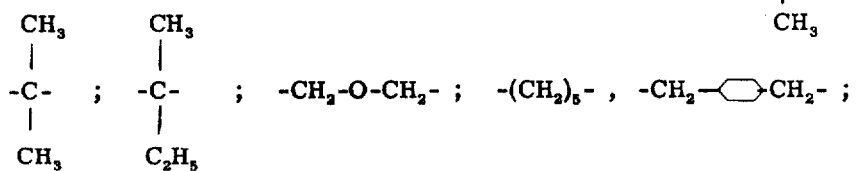

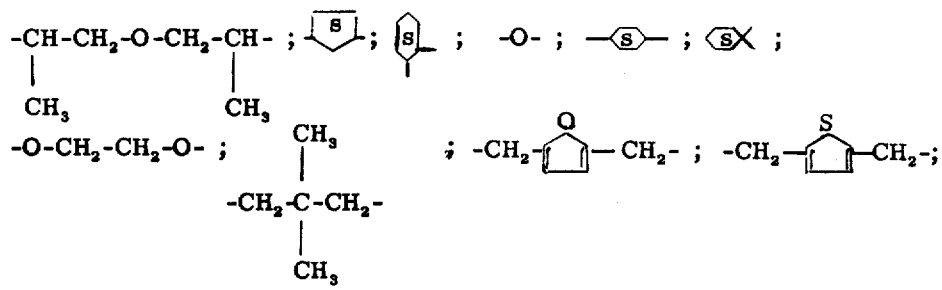

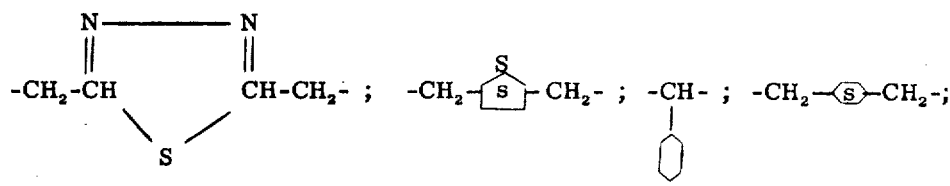

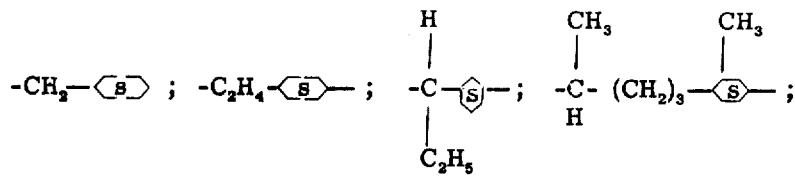

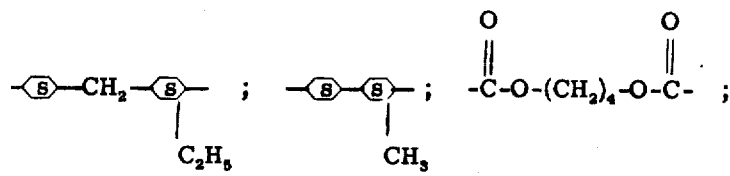

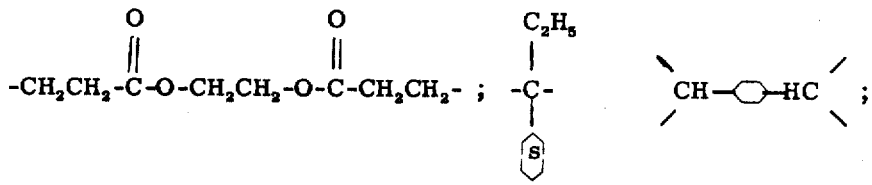

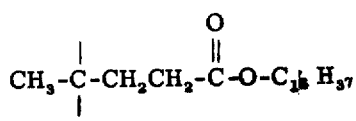

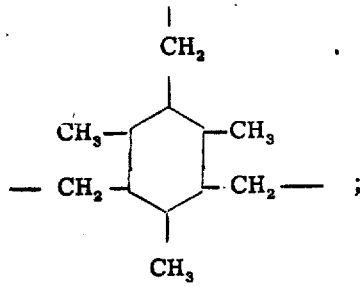

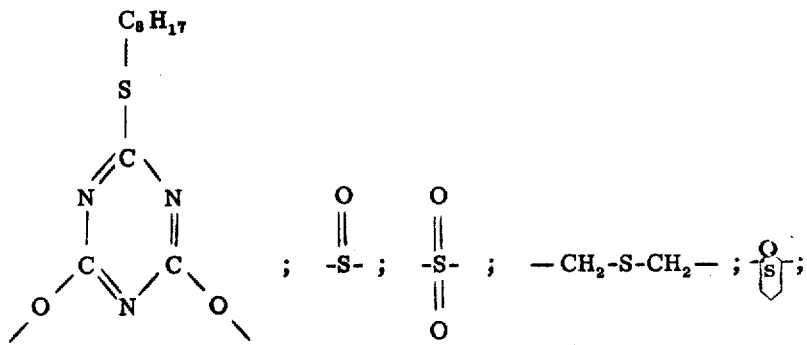

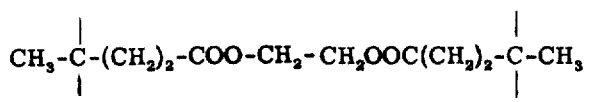

Typical Z monovalent organic radicals include alkyl groups, such as methyl, ethyl, propyl, isopropyl, butyl, isobutyl, secondary butyl, tertiary butyl, amyl, isoamyl, hexyl, isohexyl, secondary hexyl, heptyl, octyl, isooctyl, 2-ethylhexyl, nonyl, decyl, undecyl, dodecyl, tetradecyl, tridecyl, octadecyl, and behenyl, and interrupted alkyl groups such as ethoxyethyl, butoxy ethoxyethyl, and ethoxy propoxypropyl.

Typical monovalent aryl radicals include phenyl, benzyl, phenethyl, xylyl, tolyl and naphthyl, phenoxyethyl and 6-p-chlorophenoxyhexyl.

Typical monovalent cycloaliphatic radicals include cyclohexyl, cyclopentyl, and cycloheptyl, cyclooctyl, cyclodecyl and cyclododecyl, and monovalent heterocyclic radicals include pyridyl, tetrahydrofurfuryl, furyl and piperidinyl.

Typical bivalent Z groups include ethylene; propylene; octylene; 2-ethyl hexylene; 1,4-cyclohexylene; 1,2-cyclohexylene; butylene; 1,3-cyclopentylene; phenylene; and phenethylene.

The epoxy compounds are organic compounds containing at least one epoxy group.

Any epoxy compound can be used. The compounds can be aliphatic or cycloaliphatic in character, but aromatic, heterocyclic and alicyclic groups can also be present. The compounds have from 10 to 150 carbon atoms. Typical epoxy compounds are epoxy carboxylic acids such as epoxy stearic acid, glycidyl ethers of polyhydric alcohols and phenols, such as tri-glycidyl glycerine, diglycidyl ether of diethylene glycol, glycidyl epoxy stearyl ether, 1,4-bis(2,3-epoxy propoxy) benzene, 4,4'-bis(2,3-epoxy propoxy) diphenyl ether, 1,8-bis(2,3-epoxy propoxy) octane, 1,4-bis(2,3-epoxy propoxy) cyclohexane, and 1,3-bis(4,5-epoxy pentoxy)-5-chlorobenzene, the epoxy polyethers of polyhydric phenols obtained by reacting a polyhydric phenol with a halogen-containing epoxide or dihalohydrin, such as the reaction products of resorcinol, catechol, hydroquinone, methyl resorcinol or polynuclear phenols such as 2,2-bis(4'-hydroxy phenyl) propane (Bisphenol A), 2,2-bis(4'-hydroxy phenyl) butane, 4,4'-dihydroxybenzophenone and 1,5-dihydroxy naphthalene with halogen-containing epoxides such as 3-chloro-1,2-epoxy butane, 3-chloro-1,2-epoxy octane, and epichlorhydrin.

Epoxy esters will initially have had unsaturation in the alcohol or acid portion of the molecule, which is taken up by the formation of the epoxy group. Typical unsaturated acids are acrylic, oleic, linoleic, linolenic, euricic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethyl hexyl alcohol, lauryl alcohol, isoocytl alcohol, stearyl alcohol, and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerine is preferred. These alcohols may be fully or partially esterified with the epoxidized acid. Exemplary are epoxidized 1,4-butylene glycol diacrylate and epoxidized pentaerythritol tetratallate. Also useful are the epoxidized mixtures of higher fatty acid esters found in naturally-occurring oils such as epoxidized cottonseed oil, epoxidized tall oil fatty acid esters, epoxidized coconut oil and epoxidized tallow. Of these, epoxidized soybean oil is preferred.

The alcohol can contain the epoxy group and have a long or short chain, and the acid can have a short or long chain, such as epoxy stearyl acetate, epoxy stearyl stearate, glycidyl stearate, and polymerized glycidyl methacrylate.

The stabilizer combinations of the invention are effective with acrylonitrile-butadiene-styrene polymers as a class. Many of the ABS polymers available commercially are prepared by dispersing an elastomeric phase such as a diene homopolymer, such as polybutadiene, into a rigid styrene-acrylontrile copolymer or a terpolymer. The elastomeric phase can also be a copolymer with a styrene or acrylonitrile, or a styrene acrylonitrile graft on an elastomeric substrate, such as polybutadiene. The contribution of the acrylonitrile, styrene and butadiene is each important. Terpolymers of the three monomers do not always have the desired properties, and ABS graft copolymers are most common, and include a styrene acrylonitrile copolymer phase and a preformed polybutadiene substrate on which is grafted styrene and acrylonitrile, usually by emulsion, bulk or suspension polymerization. See *Chemistry and Industry*, Aug. 13, 1966, pages 1399–1405. All of these are encompassed herein under the terms "acrylonitrile-butadiene-styrene polymer," or "ABS polymer."

ABS polymers generally contain from about 15 to about 35 percent acrylonitrile, from about 5 to about 35 percent butadiene, and from about 40 to about 80 percent styrene, by weight. The matrix usually has a molecular weight of from about 200,000 to about 450,000 or more, and a density of from about 0.99 to about 1.09.

The acrylonitrile portion of the ABS polymer imparts chemical resistance to the polymer; the styrene portion of the ABS polymer imparts good fabrication characteristics to the polymer; and the rubber or butadiene portion of the ABS polymer provides the rubberiness and toughness to the polymer. Accordingly, chemical resistance, good fabrication characteristics, and rubberiness and toughness features can be varied in any given ABS polymer by varying the quantities of the acrylonitrile, butadiene and styrene. For example, the impact strength of the ABS polymer can be increased by increasing the amount of butadiene in the polymer. However, increase in impact strength is accompanied by slight reduction in heat resistance, rigidity, electrical properties and some of the other strength properties.

Heat-resistance properties of the ABS polymer can be improved by increasing the amount of acrylonitrile in the polymer. However, increased heat resistance, such as increasingly high heat-distortion temperatures, usually is accompanied by decreased impact strength, especially at low temperatures. Increasingly good fabrication characteristics of the polymer are obtained where larger quantities of styrene are used. However, such an ABS polymer usually has lower impact strength. Accordingly, the impact strength of ABS polymer at 73°F. varies from 9 ft.-lb./in. notch in extra high and low temperature impact grades, to 1.5 for medium impact grades.

The tensile strength of ABS polymer varies from 8,800 psi for medium impact grades, with a tensile modulus of 400,000, to as low a tensile strength as 2,400 psi, for a semiflexible extrusion grade, and a tensile modulus of 2,100,000. The hardness of ABS polymer ranges from a Rockwell 118 for medium impact grade to a Rockwell 62 for a low temperature grade material. The range of deflection temperature for ABS polymer is from 230°F. at 264 psi and 240°F at 66 psi., respectively, for heat resistant grades, to as low as 145°F. at 264 psi and 202°F. at 66 psi, respectively, with most commercial grades falling in the upper end of the range.

ABS polymer can be prepared by polymerizing acrylonitrile monomer and styrene monomer in a previously prepared polybutadiene latex, or butadiene copolymer rubber latex, under such conditions that an appreciable portion of the acrylonitrile and styrene become grafted or polymerized directly on the polybutadiene molecules. The polybutadiene portion or base portion of the ABS graft polymer molecule is rubbery, while the acrylonitrile and styrene grafted comonomer portions of the graft polymer molecule are resinous. See U.S. Pat. No. 2,820,733 dated Jan. 21, 1958, to Childers and Fisk for a detailed description of the graft polymerization technique for forming ABS polymer.

ABS polymer can also be prepared by blending styrene-acrylonitrile copolymer resins with butadiene-based elastomers, such as is described in U.S. Pat. No. 2,439,902, dated Apr. 6, 1948 to Daly, and No. 2,600,024, dated June 10, 1952, to Romeyn et al.

In addition, ABS graft copolymer can be physically blended with additional quantities of separately prepared resin, for example, styrene-acrylonitrile resin, with or without additional separately prepared butadiene-acrylonitrile copolymer rubber. See U.S. Pat. No. 2,802,808 dated Aug. 13, 1957 to Hayes for a complete description of the preparation of ABS polymer from ternary blends containing a resin, for example, a copolymer of styrene for α-methylstyrene with acrylonitrile or methacrylonitrile; a rubber, for example, polybutadiene or butadiene copolymer; and a graft copolymer of stryene-acrylonitrile and butadiene.

Mixtures of ABS polymers with other compatible polymers, (for example, the polycarbonate of 4,4'-isopropylidene-bisphenol) and copolymers of acrylontrile, or methacrylonitrile, butadiene, and styrene, such as acrylonitrile-styrene, butadiene-styrene, and butadiene-acrylonitrile rubber, the ABS polymer being present in a sufficient amount, usually a major amount, that is about 85 percent by weight or more, to present the stabilization problem resolved by the invention, can also be stabilized.

Furthermore, the styrene monomer of the ABS polymer can be replaced in whole or in part by α-methylstyrene in order to improve the heat distortion temperatures of the ABS polymer. Similarly, methyl methacrylate can be used in place of some of the acrylonitrile.

All of the above polymers fall within the term "ABS polymer," as used herein.

Typical available ABS polymers and their physical properties are:

TABLE A

CYCOLAC ABS POLYMERS

| GRADE AND CHARACTERISTICS | CONDITION | UNITS | ASTM TEST METHOD | GS<br>MAXIMUM TOUGHNESS WITH HIGH MODULUS<br>GSM INJECTION AND BLOW MOLDING<br>GSE EXTRUSION | 7<br>TOUGHNESS WITH HIGH FLOW<br>INJECTION MOLDING | X-27<br>MAXIMUM HIGH HEAT WITH HIGH MODULUS<br>INJECTION MOLDING<br>EXTRUSION |
|---|---|---|---|---|---|---|
| PROPERTIES Reported values pertain only to natural resins; pigmenting may vary the properties | | | | | | |
| MECHANICAL | | | | | | |
| Izod Impact Strength, unnotched | 73°F | ft.-lbs./in. notch | | 29.3 | 26.0 | 33.0 |
| ⅛" bar (2) notched | 73°F | | D-256-56 Method A | 6.2 | 5.3 | 3.1 |
| | −20°F | | | 2.6 | 2.1 | 1.3 |
| | −40°F | | | 2.1 | 1.8 | 1.0 |
| Charpy Impact Strength, unnotched | 73°F | ft.-lbs./in. notch | D-256-56 Method B | 35.0 | 26.0 | 19.3 |
| ¼" bar (1) notched | 73°F | | | 4.7 | 3.7 | 1.9 |
| | −20°F | | | 2.6 | 2.1 | 1.1 |
| | −40°F | | | 2.2 | 1.7 | 0.9 |
| Tensile Strength, Type I | 160°F | psi | D-638-61T | 3,400 | 3,200 | 4,600 |
| ⅛" thickness (2) | 73°F | | 0.2"/min. | 5,900 | 6,000 | 7,300 |
| | −40°F | | | 9,200 | 9,500 | 11,500 |
| Tensile Modulus, Type I | 73°F | psi | D-638-61T 0.2"/min. | 310,000 | 300,000 | 390,000 |
| ⅛" thickness (2) | | | | | | |
| Flexural Strength | 160°F, 73°F and −40°F | psi | D-790-61 0.05"/min. | No failure | No failure | No failure |
| ⅛".x 1" x 4" bar (1) | | | | | | |
| Flexural Yield Strength | 160°F | psi | D-790-61 0.05"/min. | 5,700 | 5,500 | 7,500 |
| ⅛" x 1" x 4" bar (1) | 73°F | | | 9,700 | 9,600 | 11,800 |
| | −40°F | | | 15,200 | 15,100 | 18,800 |
| Flexural Modulus | 160°F | psi | D-790-61 0.05"/min. | 220,000 | 210,000 | 310,000 |
| ⅛" x 1" x 4" bar (1) | 73°F | | | 320,000 | 320,000 | 400,000 |
| | −40°F | | | 360,000 | 360,000 | 460,000 |
| Hardness ¼" thickness (1) | 73°F | Rockwell R | D-785-62 Method A | 103 | 104 | 112 |
| Wear Index, Taber Volume Loss Method CS-17 Wheel, 1000g. weight | 73°F 50% R.H. | % | | 19.2 | 18.8 | |
| Deformation Under Load (1) | 24 hr.,122°F 2000 psi | % | D-621-59 | 0.52 | 0.53 | 0.21 |
| THERMAL | | | | | | |
| Coefficient of Linear Thermal Expansion | | in./in./°C. in./in./°F. | D-696-44 Calculated | $9.5 \times 10^{-5}$<br>$5.3 \times 10^{-5}$ | $9.5 \times 10^{-5}$<br>$5.3 \times 10^{-5}$ | $6.0 \times 10^{-5}$<br>$3.3 \times 10^{-5}$ |
| Deflection Temperature, Unannealed | 264 psi | °F. at | D-648-56 | 193 | 192 | 226 |
| ½" x ½" x 5" bar (1) | 66 psi | 10 mils | | 211 | 209 | 238 |
| | zero load | Deflection | | 221 | 220 | 250 |
| Deflection Temperature, Annealed | 264 psi | °F. at | D-648-56 | 218 | 215 | 244 |
| ½" x ½" x 5" bar (1) | 66 psi | 10 mils | | 224 | 221 | 249 |
| | zero load | Deflection | | 229 | 226 | 254 |
| Thermal Conductivity | | BTU/hr./ft.²/°F./in.<br>Cal/Sec/cm²/°C/cm. | C-177-45 | 1.55<br>$5.45 \times 10^{-4}$ | 1.54<br>$5.30 \times 10^{-4}$ | 2.38<br>$8.18 \times 10^{-4}$ |
| Flammability ⅛" x ½" x 5" bar (1) | | in/min. | D-635-63 | 1.5 | 1.5 | 1.8 |
| ANALYTICAL | | | | | | |
| Specific Gravity (1) | 73°F | | D-792-60T Method A | 1.04 | 1.04 | 1.06 |
| Water Absorption (2) | 73°F | % | D-570-63 | 0.43 | 0.40 | 0.36 |
| Mold Shrinkage (2) | | in./in. | D-955-51 | 0.006 | 0.005 | 0.004 |

TABLE A—Continued

|  | CONDITION | UNITS | ASTM TEST METHOD | CYCOLON MEDIUM IMPACT ABS POLYMERS | | | SPECIAL ABS RESINS |
|---|---|---|---|---|---|---|---|
|  |  |  |  | A | AM | DM | EP-3510 |
| PROPERTIES<br>Reported values pertain only to natural resins; pigmenting may vary the properties |  |  |  | AM FOR INJECTION MOLDING<br>AE FOR EXTRUSION | HIGH HEAT<br>INJECTION MOLDING | HIGH HEAT<br>INJECTION MOLDING | GREY ONLY, FOR CHROME PLATED PARTS<br>INJECTION MOLDING<br>EXTRUSION |
| MECHANICAL |  |  |  |  |  |  |  |
| Izod Impact Strength, unnotched | 73°F | ft.-lbs./in. notch |  | 23.0 | 18.3 | 15.0 | 26.0 |
| ¼" bar (2)             notched | 73°F |  | D-256-56 Method A | 4.0 | 4.0 | 3.5 | 4.5 |
|  | −20°F |  |  | 1.4 | 1.4 | 1.2 | 1.4 |
|  | −40°F |  |  | 1.0 | 1.0 | 0.8 | 1.0 |
| Charpy Impact Strength, unnotched | 73°F | ft.-lbs./in. notch | D-256-56 Method B | 19.0 |  |  | 26.0 |
| ¼" bar (1)            notched | 73°F |  |  | 2.6 |  |  | 3.7 |
|  | −20°F |  |  | 1.5 |  |  | 1.6 |
|  | −40°F |  |  | 1.2 |  |  | 1.5 |
| Tensile Strength, Type I | 160°F | psi | D-638-61T 0.2"/min. | 3,500 |  |  | 3,200 |
| ⅛" thickness (2) | 73°F |  |  | 6,300 | 6,800 | 7,800 | 6,000 |
|  | −40°F |  |  | 10,000 |  |  | 9,500 |
| Tensile Modulus, Type I | 73°F | psi | D-638-61T 0.2"/min. | 330,000 | 350,000 | 380,000 | 310,000 |
| ⅛" thickness (2) |  |  |  |  |  |  |  |
| Flexural Strength | 160°F, 73°F | psi | D-790-61 0.05"/min. | No failure |  |  | No failure |
| ⅛" x 1" x 4" bar (1) | and −40°F |  |  |  |  |  |  |
| Flexural Yield Strength | 160°F | psi | D-790-61 0.05"/min. | 5,400 | 6,800 | 7,700 | 5,500 |
| ⅛" x 1" x 4" bar (1) | 73°F |  |  | 9,900 | 11,000 | 11,800 | 9,200 |
|  | −40°F |  |  | 17,300 | 17,500 | 18,100 | 15,100 |
| Flexural Modulus | 160°F | psi | D-790-61 0.05"/min. | 240,000 | 250,000 | 300,000 | 210,000 |
| ⅛" x 1" x 4" bar (1) | 73°F |  |  | 360,000 | 370,000 | 400,000 | 330,000 |
|  | −40°F |  |  | 420,000 | 410,000 | 440,000 | 360,000 |
| Hardness | 73°F | Rockwell R | D-785-62 Method A | 108 | 108 | 112 | 104 |
| ¼" thickness (1) |  |  |  |  |  |  |  |
| Wear Index, Taber Volume Loss Method CS-17 Wheel, 1000g. weight | 73°F<br>50% R.H. | % |  |  |  |  |  |
| Deformation Under Load (1) | 24 hr.,122°F 2000 psi | % | D-621-59 | 0.51 | 0.54 | 0.37 | 0.53 |
| THERMAL |  |  |  |  |  |  |  |
| Coefficient of Linear Thermal Expansion |  | in./in./°C.<br>in./in./°F. | D-696-44 Calculated | $8.3 \times 10^{-5}$<br>$4.6 \times 10^{-5}$ | $8.5 \times 10^{-5}$<br>$4.7 \times 10^{-5}$ | $7.2 \times 10^{-5}$<br>$4.0 \times 10^{-5}$ | $9.5 \times 10^{-5}$<br>$5.3 \times 10^{-5}$ |
| Deflection Temperature, Unannealed | 264 psi | °F. at | D-648-56 | 187 | 198 | 199 | 192 |
| ½" x ½" x 5" bar (1) | 66 psi | 10 mils |  | 203 | 210 | 217 | 209 |
|  | zero load | Deflection |  | 216 | 222 | 227 | 220 |
| Deflection Temperature, Annealed | 264 psi | °F. at | D-648-56 | 199 | 221 | 223 | 215 |
| ½" x ½" x 5" bar (1) | 66 psi | 10 mils |  | 211 | 223 | 227 | 221 |
|  | zero load | Deflection |  | 220 | 227 | 232 | 226 |
| Thermal Conductivity |  | BTU/hr./ft.²/°F./in.<br>Cal/Sec/cm²/°C/cm. | C-177-45 | 1.49<br>$5.12 \times 10^{-4}$ |  |  | 1.54<br>$5.30 \times 10^{-4}$ |
| Flammability | | in/min. | D-635-63 | 1.6 | 1.6 | 1.6 | 1.5 |
| ⅛" x ½" x 5" bar (1) |  |  |  |  |  |  |  |
| ANALYTICAL |  |  |  |  |  |  |  |
| Specific Gravity (1) | 73°F |  | D-792-60T Method A | 1.05 | 1.04 | 1.05 | 1.07 |
| Water Absorption (2) | 73°F | % | D-570-63 | 0.40 | 0.33 | 0.32 | 0.40 |
| Mold Shrinkage (2) |  | in./in. | D-955-51 | 0.005 | 0.004 | 0.004 | 0.005 |

CYCOLAC ABS POLYMERS

| GRADE AND CHARACTERISTICS | CONDITION | UNITS | ASTM TEST METHOD | L | CG | E |
|---|---|---|---|---|---|---|
| PROPERTIES<br>Reported values pertain only to natural resins; pigmenting may vary the properties |  |  |  | GOOD TOUGHNESS AT LOW TEMP.<br>INJECTION MOLDING | TOUGHNESS WITH LOW GLOSS | VERY HIGH IMPACT AT LOW TEMP.<br>INJECTION MOLDING |

TABLE A—Continued

| | | | | EXTRUSION | EXTRUSION | EXTRUSION |
|---|---|---|---|---|---|---|
| MECHANICAL | | | | | | |
| Izod Impact Strength, unnotched | 73°F | ft.-lbs./in. notch | | No break | No break | No break |
| ¼" bar (2) notched | 73°F | | D-256-56 | 6.7 | 8.0 | 8.5 |
| | −20°F | | Method A | 4.3 | | |
| | −40°F | | | 2.8 | 2.0 | 3.0 |
| Charpy Impact Strength, unnotched | 73°F | ft.-lbs./in. notch | D-256-56 | No break | | |
| ¼" bar (1) notched | 73°F | | Method B | 6.0 | | |
| | −20°F | | | 3.7 | | |
| | −40°F | | | 3.1 | | |
| Tensile Strength, Type I | 160°F | psi | D-638-61T | 2,600 | | |
| ⅛" thickness (2) | 73°F | | 0.2"/min. | 5,000 | 5,000 | 4,800 |
| | −40°F | | | 7,400 | 6,500 | |
| Tensile Modulus, Type I | 73°F | psi | D-638-61T | 230,000 | 260,000 | 230,000 |
| ⅛" thickness (2) | | | 0.2"/min. | | | |
| Flexural Strength | 160°F, 73°F | psi | D-790-61 | No failure | No failure | No failure |
| ⅛"×1"×4" bar (1) | and −40°F | | 0.05"/min. | | | |
| Flexural Yield Strength | 160°F | psi | D-790-61 | 4,300 | 3,500 | |
| ⅛"×1"×4" bar (1) | 73°F | | 0.05"/min. | 7,800 | 7,200 | 7,300 |
| | −40°F | | | 12,100 | 10,500 | |
| Flexural Modulus | 160°F | psi | D-790-61 | 160,000 | 140,000 | |
| ⅛"×1"×4" bar (1) | 73°F | | 0.05"/min. | 250,000 | 260,000 | 230,000 |
| | −40°F | | | 180,000 | 300,000 | |
| Hardness | 73°F | Rockwell R | D-785-62 | 89 | 88 | 85 |
| ¼" thickness (1) | | | Method A | | | |
| Wear Index, Taber | 73°F | % | | 23.0 | | |
| Volume Loss Method | 50% R.H. | | | | | |
| CS-17 Wheel, 1000g. weight | | | | | | |
| Deformation Under Load (1) | 24 hr.,122°F 2000 psi | % | D-621-59 | 1.12 | | |
| THERMAL | | | | | | |
| Coefficient of Linear Thermal Expansion | | in./in./°C. in./in./°F. | D-696-44 Calculated | 10.1×10⁻⁵ 5.6×10⁻⁵ | 10.0×10⁻⁵ | |
| Deflection Temperature, Unannealed | 264 psi | °F. at | D-648-56 | 187 | 190 | 188 |
| ½"×½"×5" bar (1) | 66 psi zero load | 10 mils Deflection | | 210 224 | 214 | |
| Deflection Temperature, Annealed | 264 psi | °F. at | D-648-56 | 218 | 218 | 218 |
| ½"×½"×5" bar (1) | 66 psi zero load | 10 mils Deflection | | 224 227 | 225 | |
| Thermal Conductivity | | BTU/hr./ft.²/°F./in. Cal/Sec/cm²/°C/cm. | C-177-45 | 1.56 5.05×10⁻⁴ | | |
| Flammability | | in/min. | D-635-63 | 1.4 | | |
| ⅛"×½"×5" bar (1) | | | | | | |
| ANALYTICAL | | | | | | |
| Specific Gravity (1) | 73°F | | D-792-60T Method A | 1.02 | 1.04 | 1.02 |
| Water Absorption (2) | 73°F | % | D-570-63 | 0.45 | | |
| Mold Shrinkage (2) | | in./in. | D-955-51 | 0.007 | | |

CYCOLAC ABS POLYMERS

| GRADE AND CHARACTERISTICS | CONDITION | UNITS | ASTM TEST METHOD | X-17 MAXIMUM HIGH HEAT WITH GOOD MOLDABILITY | X-7 HIGH HEAT WITH TOUGHNESS | H GOOD TOUGHNESS |
|---|---|---|---|---|---|---|
| PROPERTIES Reported values pertain only to natural resins; pigmenting may vary the properties | | | | INJECTION MOLDING EXTRUSION | INJECTION MOLDING EXTRUSION | INJECTION MOLDING EXTRUSION |
| MECHANICAL | | | | | | |
| Izod Impact Strength, unnotched | 73°F | ft.-lbs./in. notch | | | 32.0 | No break |
| ⅛" bar (2) notched | 73°F | | D-256-56 | 2.5 | 4.2 | 6.3 |
| | −20°F | | Method A | | 1.4 | 2.8 |
| | −40°F | | | 0.7 | 1.2 | 2.6 |
| Charpy Impact Strength, unnotched | 73°F | ft.-lbs./in. notch | D-256-56 | | 33.0 | No Break |
| ¼" bar (1) notched | 73°F | | Method B | | 3.1 | 5.3 |
| | −20°F | | | | 1.7 | 2.9 |
| | −40°F | | | | 1.4 | 2.6 |

TABLE A—Continued

| Property | Temperature | Units | ASTM | Col 1 | Col 2 | Col 3 |
|---|---|---|---|---|---|---|
| Tensile Strength, Type I 1/8" thickness (2) | 160°F 73°F −40°F | psi | D-638-61T 0.2"/min. | 7,200 | 4,000 6,900 10,400 | 2,400 4,700 7,200 |
| Tensile Modulus, Type I 1/8" thickness (2) | 73°F | psi | D-638-61T 0.2"/min. | 380,000 | 330,000 | 230,000 |
| Flexural Strength 1/8" x 1" x 4" bar (1) | 160°F, 73°F and −40°F | psi | D-790-61 0.05"/min. | No failure | No failure | No failure |
| Flexural Yield Strength 1/8" x 1" x 4" bar (1) | 160°F 73°F −40°F | psi | D-790-61 0.05"/min. | 6,800 10,600 18,100 | 6,200 10,200 16,100 | 4,100 7,600 11,800 |
| Flexural Modulus 1/8" x 1" x 4" bar (1) | 160°F 73°F −40°F | psi | D-790-61 0.05"/min. | 270,000 380,000 420,000 | 260,000 360,000 390,000 | 160,000 240,000 280,000 |
| Hardness 1/4" thickness (1) | 73°F | Rockwell R | D-785-62 Method A | 110 | 107 | 88 |
| Wear Index, Taber Volume Loss Method CS-17 Wheel, 1000g. weight | 73°F 50% R.H. | % | | | 19.0 | 22.7 |
| Deformation Under Load (1) | 24 hr., 122°F 2000 psi | % | D-621-59 | | 0.36 | 1.22 |
| THERMAL | | | | | | |
| Coefficient of Linear Thermal Expansion | | in./in./°C. in./in./°F. | D-696-44 Calculated | $6.2 \times 10^{-5}$ | $8.2 \times 10^{-5}$ $4.5 \times 10^{-5}$ | $10.4 \times 10^{-5}$ $5.8 \times 10^{-5}$ |
| Deflection Temperature, Unannealed 1/2" x 1/2" x 5" bar (1) | 264 psi 66 psi zero load | °F. at 10 mils Deflection | D-648-56 | 220 | 203 220 230 | 186 206 223 |
| Deflection Temperature, Annealed 1/2" x 1/2" x 5" bar (1) | 264 psi 66 psi zero load | °F. at 10 mils Deflection | D-648-56 | 238 | 224 230 235 | 214 222 228 |
| Thermal Conductivity | | BTU/hr./ft.²/°F./in. Cal/Sec/cm²/°C/cm. | C-177-45 | | 1.99 $6.52 \times 10^{-4}$ | 1.56 $5.05 \times 10^{-4}$ |
| Flammability 1/8" x 1/2" x 5" bar (1) | | in/min. | D-635-63 | | 1.4 | 1.4 |
| ANALYTICAL | | | | | | |
| Specific Gravity (1) | 73°F | | D-792-60T Method A | 1.06 | 1.05 | 1.02 |
| Water Absorption (2) | 73°F | % | D-570-63 | | 0.43 | 0.42 |
| Mold Shrinkage (2) | | in./in. | D-955-51 | 0.004 | 0.005 | 0.007 |

A sufficient amount of the stabilizer combination is used to enhance the resistance of the ABS polymer to discoloration at elevated temperatures. Only a small amount is required. Effective resistance to discoloration is obtained when the amount of stabilizer combination is within the range from about 0.1 to about 10 percent by weight of the polymer. Preferably, for best results, from about 0.25 to about 2 percent is used. In these combinations, the amount of organic phosphite should be within the range from about 0.05 to about 5 percent, the amount of the polycyclic polyhydric phenol should be within the range from about 0.05 to about 5 percent, and the amount of the epoxy compound should be within the range from about 0.01 to about 5 percent, by weight of the ABS polymer. Preferably, from about 0.25 to about 2 percent organic phosphite, from about 0.05 to about 2 percent polyhydric polycyclic phenol, and from about 0.25 to about 2 percent epxoy compound are employed for best results.

These stabilizer combinations generally contain from about 2.5 to about 50 parts of organic phosphite, from about 2.5 to about 50 parts of epoxy compound, and from about 0.5 to about 50 parts polyhydric polycyclic phenol.

The stabilizer composition can be formed by simply mixing the individual ingredients in the dry state or in a suitable liquid medium. Usually the phosphite and epoxy fatty acid ester will serve as the solvent for the phenol. When the phosphite is not excessively sensitive to moisture, another helpful expedient is to prepare the stabilizer composition in the form of an aqueous emulsion. Such an emulsion can be added to a freshly made ABS polymer latex before the polymer is isolated from the latex by the usual procedures of coagulation or spray-drying. A "master-batch" technique can be uitlized to provide both wet and dry combinations of the stabilizer composition with the ABS polymer in proportions for compounding into larger quantities of polymer to be stabilized.

ABS polymers are conventionally blended with additives such as fillers, pigments and lubricants. Appropriate pigments and fillers are, for example, flour, cotton, shredded or chopped cloth, talc, chopped canvas, paper pulp forms, asbestos, powdered mica, calcium carbonate, carbon, graphite, quartz, diatomaceous earth silica, fibrous glass, barytes, calcium silicate, iron, barium sulfate, litharge, clay and titanium dioxide. Fillers are normally used in an amount of from about 2 to about 40 percent by weight of the polymer. Typical lubricants are mineral oil, natural and synthetic waxes, fatty acids such as stearic acid, alkaline earth and heavy metal stearates, and aliphatic alcohols, ketones, and esters having from about 16 to about 60 carbon atoms in the molecule, including stearyl alcohol, palmitone, behenone, oleone, cetyl palmitate, in amounts of from about 0.2 to 3 percent of the polymer.

If a combination of stabilizers is to be used, it may be formulated as a simple mixture for incorporation in the ABS polymer by the polymer manufacture or by the converter. An inert organic solvent such as xylene, cyclohexanone, ethyl benzene and the like can be used to facilitate handling, if the ingredients do not form a homogeneous mixture or solution.

The following examples in the opinion of the inventors represent the best embodiments of their invention.

In the examples, the ABS polymer used was Cycolac T, a polymer of a mixture composed of 27 percent acrylonitrile, 20 percent butadiene, and 53 percent styrene. The three-component stabilizer system of the invention was evaluated against the stabilizing effect of each component thereof, taken singly and in pairs. The ABS polymer was pigmented by adding 3 parts of titanium dioxide to each 100 parts of the polymer, thus giving the unstabilized ABS polymer a creamy white initial color. The stabilizers being tested were weighed and dispersed in the unstabilized ABS polymer on a two-roll laboratory mill and fluxed at a temperature of 280° to 300°F. for 2 to 3 minutes. The milled sheets were smooth and had dull surfaces. The sheets were then cut in strips, tested for resistance to deterioration when heated in an air oven at 350° or 375°F. Samples were withdrawn at 15 minute intervals and examined for discoloration. The discoloration was then rated visually by color and numerically by color number, according to the following standard color scale:

Color Number Scale

| Color Number | Stages of Noticeable Difference in Color |
|---|---|
| 0 | No discoloration from original. |
| 1 | First noticeable discoloration from original. |
| 2 | First noticeable discoloration from 1. |
| 3 | First noticeable discoloration from 2. |
| 4 | First noticeable discoloration from 3. |
| 5 | First noticeable discoloration from 4. |
| 6 | First noticeable discoloration from 5. |

The above table is based on the color change of a non-stabilized standard polymer, which develops a further noticeably intensified discoloration in each 15 minute heating period when heated at 350°F. At 375°F., this discoloration is more prominent and more rapid, so that the sample having improved resistance to discoloration when heated will not develop a noticeably different discoloration in each heating period but will discolor more slowly, and will tend to retain a given color over one or more heating periods. Thus, a relatively stable sample after 30 to 45 minutes of heating may well retain a color number maximum of 2 or 3, as compared to 5 for the standard sample. Thus, the color number is a direct measure of the heat stability, vis-a-vis the color standard.

EXAMPLE 1

A stabilizer composition was prepared composed of 2,2-methylene-bis(4-methyl-6-nonylphenol), 2,6-bis(2-hydroxy-nonyl-5-methylbenzyl)-p-cresol, tris-(nonylphenyl) phosphite, and epoxidized soyabean oil. This system was employed to stabilize an acrylonitrile-butadiene-styrene polymer, as noted above, with and without the addition of titanium dioxide as a pigment. As controls, the individual stabilizer components were used, as well as the three pairs of these stabilizers, and a sample without any stabilizer. The test results obtained after oven ageing at 375°F are shown in Table I.

TABLE I

| Stabilizer and Amount | None | | A 1 part | | B 1 part | | C 1 part | |
|---|---|---|---|---|---|---|---|---|
| Pigment | None | TiO₂ 3 parts | None | TiO₂ 3 parts | None | TiO₂ 3 parts | None | TiO₂ 3 parts |
| Time (minutes) | | | | | | | | |
| 0 | 0 | 0 | 0 | 0 | 0 | 0 | 0 | 0 |
| 15 | 3 | 2 | 2 | 3 | 1 | 1 | 2 | 2 |
| 30 | 4 | 4 | 3 | 4 | 3 | 2 | 3 | 4 |
| 45 | 5 | 5 | 4 | 4 | 4 | 5 | 4 | 5 |

| Stabilizer and Amount | A 0.5 part B 0.5 part | | A 0.5 part C 0.5 part | | B 0.5 part C 0.5 part | | A 0.25 part B 0.55 part C 0.20 part | |
|---|---|---|---|---|---|---|---|---|
| Pigment | None | TiO₂ 3 parts | None | TiO₂ 3 parts | None | TiO₂ 3 parts | None | TiO₂ 3 parts |
| Time (minutes) | | | | | | | | |
| 0 | 0 | 0 | 0 | 0 | 0 | 0 | 0 | 0 |
| 15 | 2 | 2 | 1 | 1 | 1 | 2 | 1 | 1 |
| 30 | 3 | 4 | 2 | 3 | 3 | 3 | 2 | 2 |
| 45 | 5 | 5 | 4 | 4 | 4 | 5 | 3 | 3 |

A: 2,2-methylene bis(4-methyl-6-nonylphenol) and 2,6-bis(2-hydroxy-nonyl-5-methylbenzyl)-p-cresol mixture.
B: Tris(nonylphenyl)phosphite.
C: Epoxidized soybean oil.

The results show the synergistic effectiveness of the stabilizer system of the invention. The phenol (A) provides only a slight improvement in the natural polymer, and replaces the yellow discoloration of the unstabilized TiO₂ pigmented polymer by a reddish discoloration of greater intensity. The phosphite (B) by itself is helpful in diminishing discoloration of the pigmented polymer but does little for the natural. The epoxy compound (C) presents the opposite behaviour, of being helpful in the natural polymer and ineffective in pigmented polymer. The pair AB is actually worse than either of its components in both natural and pigmented polymer. The pair BC has a slight favorable effect in natural polymer compound to its individual components, but with TiO₂ it is no better than the unstabilized pigmented polymer. The pair AC suffers from an unfavorable effect on the initial (unheated) color of the natural polymer. Only the three-component system (ABC)

is effective with both natural and pigmented polymer, and in fact diminishes the discoloration at 375°F. to only that of an unstabilized polymer at 350°F.

EXAMPLES 2 to 8

A number of stabilizer combinations were prepared, having the composition of stabilizers shown in Tables II and III. The stabilizer systems were combined with Blendex 435 ABS polymer, a transparent ABS polymer, 100 parts by weight, in the amount shown in the Tables, with and without $TiO_2$ pigment (3 parts), and the samples oven-aged at 375°F. The results are given in Tables II and III which follow.

In these Tables, the components of the stabilizer compositions are identified as follows:

1,1,3-TRIS: 1,1,3-tris(2-methyl-4-hydroxy-5-t butylphenyl) butane
TPP: triphenyl phosphite
MOPP: monoisooctyl diphenyl phosphite
TNPP: tris-nonylphenyl phosphite
PE 3,5: pentaerythritol(3,5-di-tert-butyl-4-hydroxyphenyl)propionate
4,4-THIO: 4,4'-thiobis-6-tert-butylmetacresol
4,4-B: 4,4'-butylidene-bis-6-tert-butylmetacresol
2,2-M: 2,2'-methylene-bis(4-methyl-6-tert-butylphenol)
1,3,5-T: 1,3,5-trimethyl-2,4,6-tris-(3,5-di-tert-butyl-4-hydroxy benzyl) benzene
ESO: Epoxidized soyabean oil
BIS A: Bisphenol A-glycidyl ether, epoxy equivalent 180–195
BIS E: Bisphenol A-glycidyl ether, epoxy equivalent 550–700.

The data show the stabilizer compositions to be effective in unpigmented and pigmented ABS polymer.

TABLE II (Not Pigmented) At 375°F

| Example No. | | 2 | 3 | 4 | 5 | 6 | 7 | 8 |
|---|---|---|---|---|---|---|---|---|
| Time (min.) | Control | 1,1,3-TRIS 0.1<br>TNPP 0.6<br>ESO 0.3 | 1,3,5-T 0.1<br>TNPP 0.6<br>ESO 0.3 | PE 3,5 0.1<br>TPP 0.6<br>ESO 0.3 | 4,4-THIO 0.3<br>MOPP 0.4<br>ESO 0.3 | 4,4-B 0.3<br>MOPP 0.4<br>BIS E 0.3 | 2,2-M 0,3<br>BIS A 0.3<br>MOPP 0.4 | Stabilizer 1.0 of Example 1. |
| 0 | 0 | 0 | 0 | 0 | 0 | 0 | 0 | 0 |
| 15 | 2 | 1 | 1 | 1 | 1 | 1 | 1 | 1 |
| 30 | 4 | 2 | 2 | 2 | 1 | 2 | 1 | 3 |
| 45 | 6 | 3 | 3 | 4 | 3 | 3 | 2 | 4 |

TABLE III (Pigmented with $TiO_2$) At 375°F

| Example No. | | 2 | 3 | 4 | 5 | 6 | 7 | 8 |
|---|---|---|---|---|---|---|---|---|
| Time (min.) | Control | 1,1,3-Tris 0.1<br>TNPP 0.6<br>ESO 0.3 | 1,3,5-T 0.1<br>TNPP 0.6<br>ESO 0.3 | PE 3,5 0.1<br>TPP 0.6<br>ESO 0.3 | 4,4-THIO 0.3<br>MOPP 0.4<br>ESO 0.3 | 4,4 B 0.3<br>MOPP 0.4<br>BIS E 0.3 | 2,2-M 0.3<br>BIS A 0.3<br>MOPP 0.4 | Stabilizer 1.0 of Example 1. |
| 0 | 0 | 0 | 0 | 0 | 0 | 0 | 0 | 0 |
| 15 | 3 | 1 | 1 | 1 | 1 | 1 | 1 | 1 |
| 30 | 4 | 2 | 2 | 2 | 1 | 2 | 1 | 3 |
| 45 | 5 | 3 | 3 | 4 | 3 | 3 | 2 | 4 |

TABLE III B (Pigmented with $TiO_2$) At 375°F

| Example No. | | 2 | 3 | 4 | 5 | 6 | 7 | 8 |
|---|---|---|---|---|---|---|---|---|
| Time (min.) | control | 1,1,3-TRIS 0.1<br>TNPP 0.6<br>ESO 0.3 | 1,3,5-T 0.1<br>TNPP 0.6<br>ESO 0.3 | PE 3,5 0.1<br>TPP 0.6<br>ESO 0.3 | 4,4-THIO 0.3<br>MOPP 0.4<br>ESO 0.3 | 4,4 B 0.3<br>MOPP 0.4<br>BIS E 0.3 | 2,2-M 0.3<br>BIS A 0.3<br>MOPP 0.4 | Stabilizer 1.0 of Example 1. |
| 0 | 0 | 0 | 0 | 0 | 0 | 0 | 0 | 0 |
| 15 | 2 | 2 | 1 | 1 | 1 | 1 | 2 | 1 |
| 30 | 4 | 4 | 3 | 3 | 3 | 2 | 3 | 3 |
| 45 | 6 | 5 | 4 | 4 | 5 | 3 | 5 | 4 |

The data show the stabilizer compositions to be effective in unpigmented and pigmented ABS polymer.

The embodiments of the invention in which an exclusive privilege or property is claimed are defined as follows:

1. An acrylonitrile-butadiene-styrene polymer having its resistance to deterioration when heated at 350°F and above enhanced by an amount within the range from about 0.1 to about 10 percent by weight of the polymer of a stabilizer combination comprising a polyhydric polycyclic phenol having the formula:

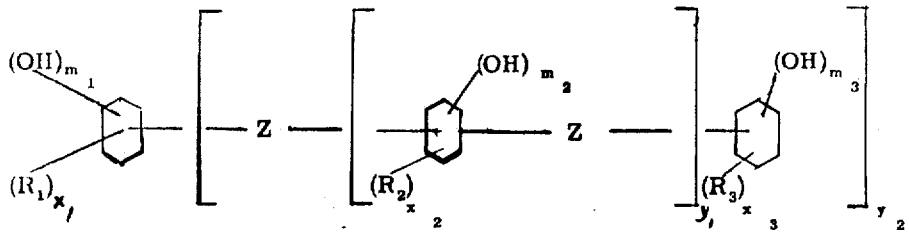

wherein $R_1$ and $R_2$ and $R_3$ are inert substituents selected from the group consisting of hydrogen, halogen, and organic radicals containing from one to about 30 carbon atoms selected from the groups consisting of alkyl, aryl, alkenyl, alkaryl, aralkyl, cycloalkenyl, cycloalkyl, alkoxy, aryloxy, acyl, carboxyl, and thiohydrocarbon groups, Z is selected from the group consisting of oxygen, sulfur, alkylene, alkenylene, alicyclene, arylene, and mixed alkylene-arylene and alkylene-alicyclene groups, $m_1$ and $m_3$ are integers from 1 to a maximum of 5, and $m_2$ is an integer from 1 to a maximum of 4, $x_1$ and $x_3$ are integers from 0 to 4, and $x_2$ is an integer from 0 to 3, $y_1$ is an integer from 0 to about 6, and $y_2$ is an integer from 1 to about 5; an organic phosphite having the formula:

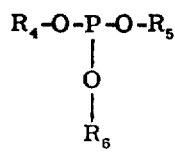

wherein $R_4$, $R_5$ and $R_6$ are selected from the group consisting of alkyl, aryl, cycloalkyl, aryl alkyl, alkyl aryl, alkyl cycloalkyl and cycloalkyl alkyl groups having from one to about 30 carbon atoms, and an epoxy compound, the organic phosphite and epoxy compound each being in an amount within the range from about 2.5 to about 50 parts by weight, and the phenol being in an amount within the range from about 0.5 to about 50 parts by weight, the amount of each being selected within such ranges to enhance the stabilizing effectiveness of the others.

2. An acrylonitrile-butadiene-styrene polymer in accordance with claim 1, in which the amount of organic phosphite is within the range from about 0.05 to about 5 percent by weight of the polymer, the amount of epoxy compound is within the range from about 0.05 to about 5 percent by weight of the polymer, and the amount of polycyclic polyhydric phenol is within the range from about 0.01 to about 5 percent by weight of the polymer.

3. An acrylonitrile-butadiene styrene polymer in accordance with claim 1, in which $R_4$, $R_5$ and $R_6$ of the organic phosphite are alkyl aryl.

4. An acrylonitrile-butadiene-styrene polymer in accordance with claim 1, in which the epoxy compound is a mono or polyhydric aliphatic alcohol ester of a fatty acid and has from 10 to 150 carbon atoms.

5. An acrylonitrile-butadiene-styrene polymer in accordance with claim 4, in which the epoxy fatty acid ester is epoxidized soya bean oil.

6. An acrylonitrile-butadiene-styrene polymer in accordance with claim 1, comprising a mixture of polyhydric polycyclic phenols.

7. An acrylonitrile-butadiene-styrene polymer in accordance with claim 1, in which Z of the polyhydric polycyclic phenol is sulfur.

8. An acrylonitrile-butadiene-styrene polymer in accordance with claim 1, in which Z of the polyhydric polycyclic phenol is alkylene.

9. An acrylonitrile-butadiene-styrene polymer in accordance with claim 1, in which Z of the polyhydric polycyclic phenol is alkenylene.

10. An acrylonitrile-butadiene-styrene polymer in accordance with claim 1 in which $R_1$, $R_2$ and $R_3$ of the polyhydric polycyclic phenol are alkyl.

* * * * *